Figure 1:
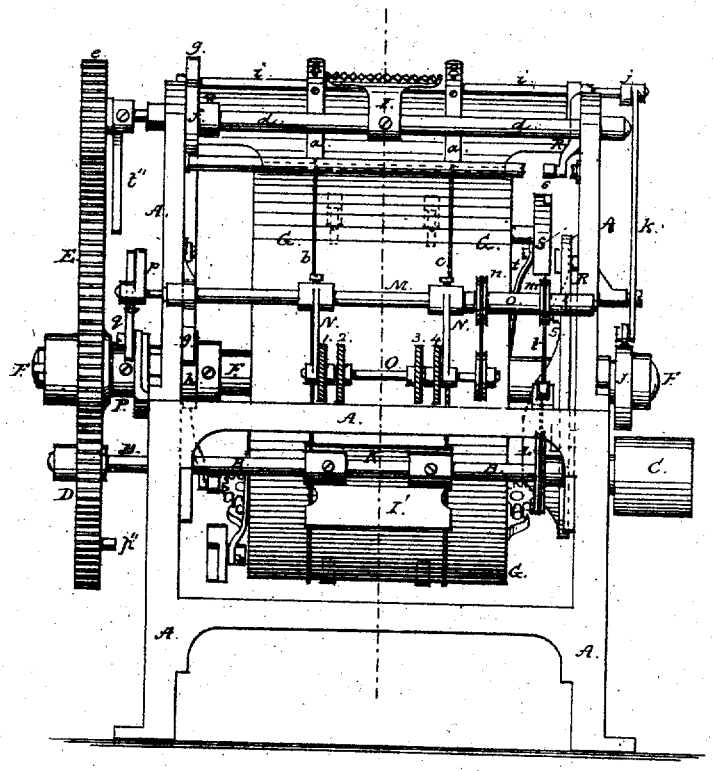

6 Sheets—Sheet 1.

J. ARKELL,

Assignor to ARKELL & SMITHS.

Paper-Bag Machine.

No. 8,824. Reissued July 29, 1879.

Witnesses;
F. W. Howard
F. W. Smith Jr.

Inventor;
James Arkell
By attorney
J. N. McPhie

J. ARKELL,

Assignor to ARKELL & SMITHS.

Paper-Bag Machine.

No. 8,824. Reissued July 29, 1879.

Witnesses;
H. W. Howard
D. J. Smith

Inventor;
James Arkell
By attorney
J. N. McIntire

J. ARKELL,

Assignor to ARKELL & SMITHS.

Paper-Bag Machine.

No. 8,824. Reissued July 29, 1879.

Witnesses;

H. W. Howard

F. H. Smith Jr.

Inventor,

James Arkell

By attorney

L. McLitue

J. ARKELL,

Assignor to ARKELL & SMITHS.

Paper-Bag Machine.

No. 8,824. Reissued July 29, 1879.

Witnesses;

F. W. Howard

D. S. Smith

Inventor:

James Arkell by attorney

J. A. McJulee

J. ARKELL,

Assignor to ARKELL & SMITHS.

Paper-Bag Machine.

No. 8,824. Reissued July 29, 1879.

Witnesses;
F. W. Howard
P. W. Smith

Inventor,
James Arkell
By attorney
J. McPutre

J. ARKELL,
Assignor to ARKELL & SMITHS.
Paper-Bag Machine.
No. 8,824. Reissued July 29, 1879
Diagr. 1.
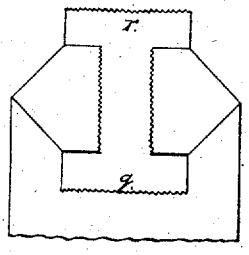
Diagr. 2.
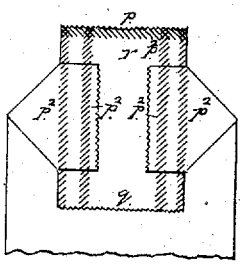
Diagr. 3.
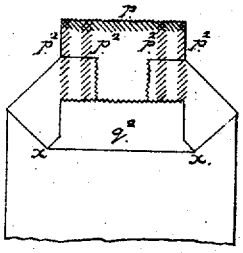
Diagr. 4.
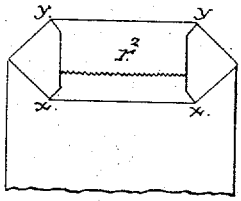
Diagr. 5.
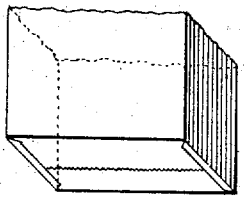
Witnesses
F. W. Howard
P. W. Smith
Inventor
James Arkell
By attorney
J. N. McIntire

UNITED STATES PATENT OFFICE.

JAMES ARKELL, OF CANAJOHARIE, NEW YORK, ASSIGNOR TO ARKELL & SMITHS, OF SAME PLACE.

IMPROVEMENT IN PAPER-BAG MACHINES.

Specification forming part of Letters Patent No. 122,099, dated December 26, 1871; Reissue No. 8,824, dated July 29, 1879; application filed June 11, 1879.

*To all whom it may concern:*

Be it known that I, JAMES ARKELL, of Canajoharie, in the county of Montgomery and State of New York, have invented certain new and useful Improvements in Paper-Bag Machines; and I do hereby declare the following to be a full, clear, and exact description thereof, reference being had to the accompanying drawings, making part of this specification, and to the letters of reference marked thereon.

As is well known to those skilled in the art, the bags or sacks are usually made from a roll of material which is passed over a suitable former and has its edges pasted together, so as to be delivered from said former in the shape of a flattened tube, which is cut up into suitable lengths or short tubes, each of which may have one end cut and creased or partially folded in a peculiar manner to facilitate the next subsequent operation of forming the bottom.

To this operation of forming the bottom of the bag by pasting and folding over the material into the requisite shape, my invention relates.

My invention has for its object to provide for use a machine for successfully and more economically performing this part of the operation in the manufacture of satchel-bottom bags or sacks from said bag-blanks; and consists, in general terms, in a machine in which the mode of operation is such that the partially-formed sack, or the prepared sack-body, is carried automatically through the machine on a carrier or bed which moves always in the same direction, and on which it is successively subjected to the operations of mechanisms or devices for applying the paste and making the folds to finish the bag-bottom, as will be hereinafter more fully explained; and my invention further consists in certain novel combinations of devices for performing the several operations by which the bag-bottom is completed, as will be hereinafter more fully explained.

Figure 2:
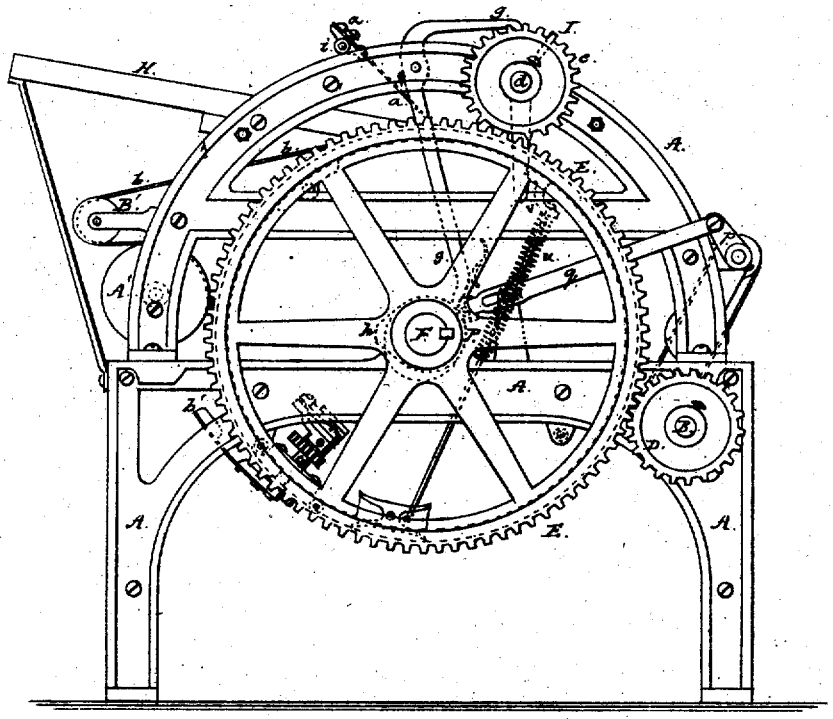
Figure 3:
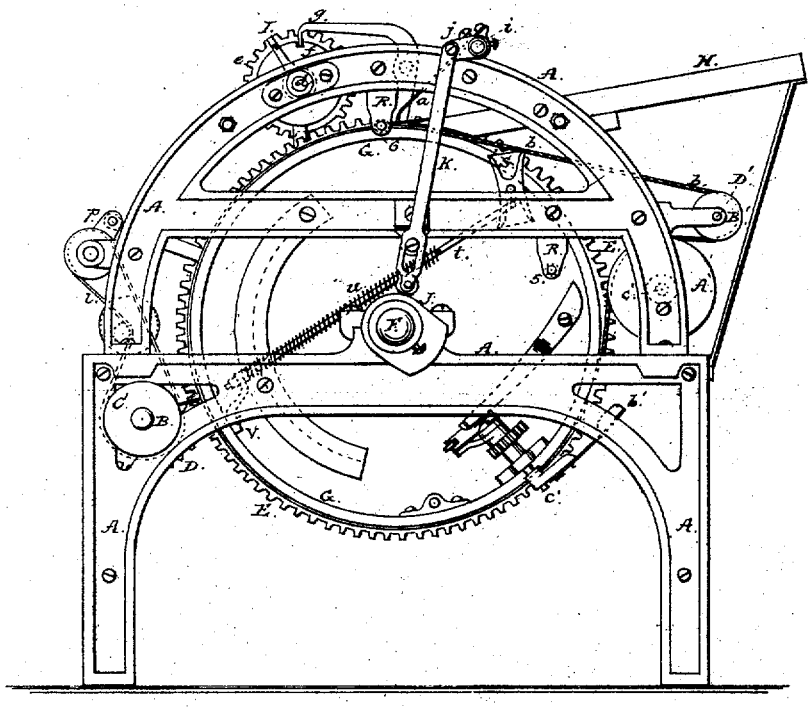
Figure 4:
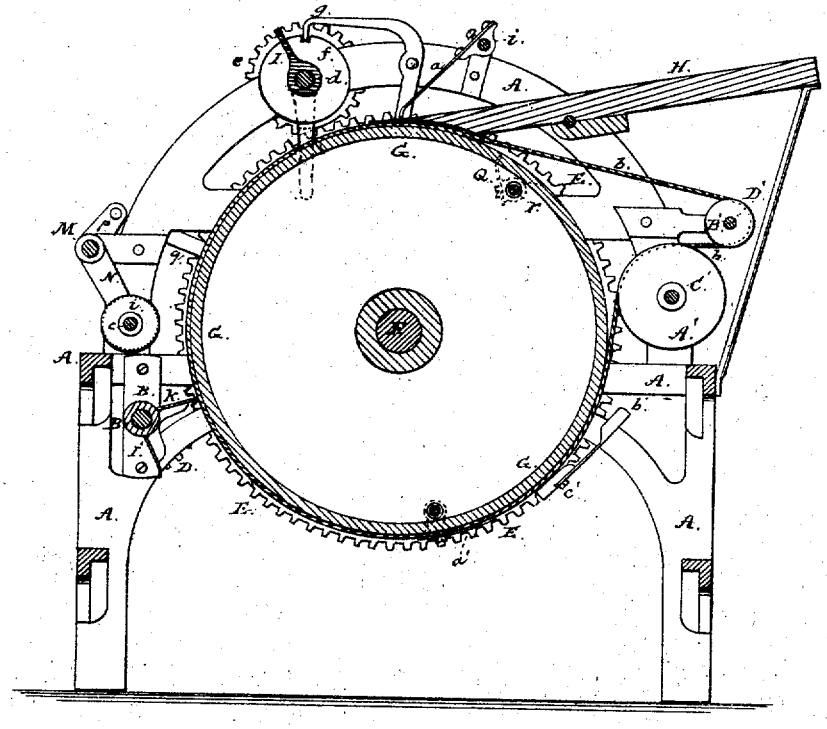
Figure 5:
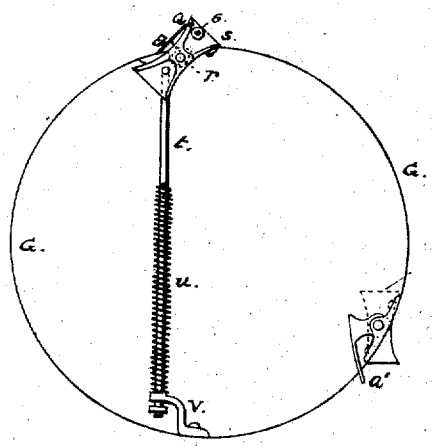
Figure 6:
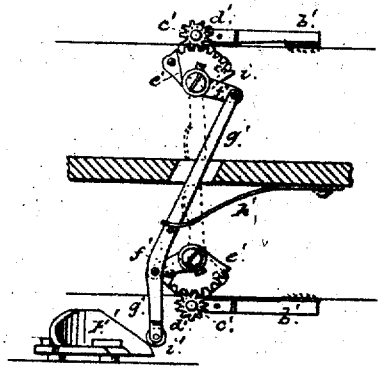

To enable those skilled in the art to make and use my invention, I will proceed to more fully describe it, referring by letters to the accompanying drawings, which make part of this specification, and in which the diagrams Nos. 1, 2, 3, 4, and 5 illustrate the different conditions of the bag during its manufacture, as I will presently more fully explain, and in which the Figures 1, 2, 3, 4, 5, and 6 are, respectively, a front elevation, side view, side elevation, vertical section, skeleton view of griping mechanism, and skeleton view of folding mechanism.

In the several figures the same part of the machine is designated by the same letter of reference.

In order that the specification of the machine may be more readily understood, I will, before describing its construction and operation, proceed to explain by the diagrams the several operations and effects which the machine is designed to perform on and produce in the partially-prepared material which is to be passed through the said machine.

At No. 1 of the diagrams is illustrated, partially formed, a paper sack, (such as is usually manufactured by me for putting up flour, &c.,) in the condition in which the article is supplied to the machine, (to be presently described,) where it first has the paste or other adhesive material applied to it, as illustrated at $p$ and $p^2$ $p^2$, No. 2, next has the portion $q$ folded over, as seen at $q^2$, No. 3, and finally has the portion $r$ folded over, as seen at $r^2$, No. 4, when the sack is finished, so as to present, when distended or filled, the appearance, as illustrated at No. 5, of a satchel-bottom bag.

In the several figures, A is the frame of the machine, in which are mounted all the working parts. B is the main driving-shaft, to which power and motion are imparted, through the medium of a pulley, C, and driving-belt, from any suitable motor in the usual manner.

On one end of shaft B is a driving-pinion, D, which engages with a large spur-gear, E, which is keyed on a shaft, F, that is mounted in suitable bearing-boxes about the middle of the frame of the machine, and which carries a large drum or cylinder, G, which receives and carries along on its external face the material to be operated on, as will be presently explained.

H is the feed-table, on which the partially-formed sacks are placed, and from which they are fed into the machine by the operative or attendant after the fashion of feeding a printing-press.

*a a* are stop-fingers or registers, against the lower bent ends of which the mouth end of the bag is placed by the attendant to insure the proper position of the material or bag on the face of the cylinder; and *b c* are bands or cords, which serve to properly lead it off from the cylinder and out of the machine, as will be hereinafter explained.

I is a paster or intermittently-moving arm, which receives a proper supply of paste from a suitable paste-reservoir. (Not shown in the drawings.) It is mounted on a shaft, *d*, which turns in suitable bearing-boxes in the main frame A, and which is driven by means of a spur-sector, *e*, that is keyed fast thereon, and which is made to periodically engage with, and be once rotated by, the main gear E, in the following manner: A tappet-arm, *t''*, (see Figs. 1 and 2,) is secured to said shaft *d* in such a manner that when the spur-sector *e*, shaft *d*, and paster I are in their non-operative positions said tappet-arm will depend about vertically from said shaft; and on the inner side of the rim of the main gear E is a laterally-projecting pin or stud, *p''*, which, once during each revolution of said gear, strikes the said tappet-arm and vibrates it far enough to so turn the shaft *d* and its sector *e* as to bring the teeth of the latter into full engagement with those of said gear E. The said gear then causes said sector *e* to make almost an entire revolution, when the latter runs out of engagement with the former, and again comes to its non-operative position and a state of rest, leaving the tappet-arm *t''* in a position to be again struck at the next revolution of gear E to produce a repetition of the desired movement of the shaft *d*, in the manner first explained; and this periodical rotative movement of said shaft *d* causes the desired movements of the paster I, presently explained.

*f* is a disk, fast on shaft *d*. This disk has a notch in its edge or face, into which catches the bent end of a retaining bar or arm, *g*, pivoted to the frame A; and said bar *g* is at intervals drawn back (to release the disk *f*) by means of a cam, *h*, on the shaft F.

The register fingers or stops *a a* are secured at their upper ends to a rock-shaft, *i*, which is moved, through the medium of a crank, *j*, and bar *k*, by the cam J on shaft F.

On the main driving-shaft B are secured the creasers K and I', (the operation of which will be presently explained,) and also a pulley, L, from which latter passes a belt, *l*, to the pulley *m*, which latter, together with pulley *n*, is fast on or part of a sleeve or hollow shaft, *o*, that turns freely on the shaft M, and on which is secured a frame, N, that carries the counter or short shaft O.

The shaft M is mounted in suitable bearings in the frame A, and is periodically rocked or oscillated, through the medium of crank *p* and rod *q*, by a cam, P, on the shaft F, and on the shaft O are mounted four paste-wheels, 1 2 3 4, which are kept supplied in any suitable manner from a reservoir, (not shown,) and from the peripheries of which paste is supplied to the bag-bottom.

Q Q are griper fingers or dogs, which clasp or hold the mouth end of the bag securely on the face of the drum or carrier G. They work back and forth in slots in the face of said drum, and are operated by means and in the manner I will now explain, viz: Said fingers are fast on a rock-shaft, *r*, which, as seen, is mounted in suitable boxes on the internal face of the rim of drum G; and on one end of said shaft is secured a shoe-piece, *s*, from which extends a rod, *t*, provided with a spiral spring, *u*, and passing through a stand, *v*, (see Fig. 5,) and so arranged that the tendency of said spring-rod attachment is to hold the shoe-piece in either of the two positions in which it may be placed, (these two positions being those which the rock-shaft *r* assumes when the fingers Q are either drawn in or thrown out to clasp the bag.) This shoe-piece *s* is formed with two cam-like depressions, in which work alternately (as said shoe travels around with the carrier-drum or cylinder) two rolls or caster-wheels, 5 and 6, which are mounted in little stands R that are bolted to and project from the main frame A, as seen; and as the shoe-piece *s* travels along and is struck by first one and then the other of the wheels 5 and 6, it is oscillated in first one and then the other direction, and so rocks the shaft as to alternately throw the said fingers out to clasp and carry in a bag, and to release it when finished and passing to the discharging mechanism.

The pulleys A' B', mounted on shafts C' D', as shown, together with the cords or bands *b c* passing around them, as seen, lead off and discharge the finished bags under the table on which the attendant places the work to be fed to the machine.

*a'* are the folding arms or blades which effect the last fold of the bag-bottom. They, like the griper-fingers Q, are protruded through the face of the cylinder or drum, and are worked from a rock-shaft by mechanism and in a manner similar to that just described in connection with said fingers Q, the only difference in operation being that, while the fingers Q are short and are so arranged that only their extreme ends protrude and clasp the edge of the mouth of the bag, the blades *a'* are long and are so arranged that their axes of motion shall be about coincident with the line in which occurs that fold in the bag-bottom which these blades press down.

*b' b'* are folding arms or sweeps, which gather up and fold over the stock to form the first fold made in the bottom-forming operation of the machine. They are mounted on short shafts or studs *c'*, that turn in stands secured to the rim of the drum, and which are provided with pinions *d'*, which mesh into sectors *e'*. These sectors are each provided with an arm, *f'*, (see Fig. 6,) and to these arms is connected a bar, *g'*, which is held in one direction by a spring, *h'*, and is forced at intervals in the opposite direction by means of a cam-plate, F', which presses against a roll or caster, $i'$, in the end of said bar $g'$, and by the alternate movements endwise of the said bar in opposite directions the sectors $e'$ are worked, and from them, through the medium of pinions $d'$, the folders $b'$ $b'$ are operated.

After what has been said of the detailed construction and operation of parts, the following explanation of the general operation of the machine will be readily understood.

Motive power being applied to the main shaft, and the machine thus put in motion, the prepared stock or partially-formed bags, in the condition seen at diagram No. 1, are fed from the table (with their mouths or open ends toward the machine) against the stop-fingers $a$ $a$, and there allowed by the attendant to rest until the griper-fingers come along and carry each bag along on the face of the drum or cylinder G, the stop-fingers $a$ $a$ being automatically lifted by the means already described to permit said griper-fingers to carry off the blank.

When arrived at the proper position the paster I, which by this time has begun to make one of its periodical movements, comes in contact with the material and puts a coating of paste along the edge at $p$, (see Diagram 2,) and then the paste-wheels 1 2 3 4 move up and apply the paste in four lines, as seen at $p^2$, Diagram 2. As the bag is carried on, the edge of creaser I′ comes up and indents the material at the line $x$ $x$, Diagram 3, while at the same time the folders $b'$ $b'$ gather up and fold over the stock, as shown at Diagram No. 3, and as the bag further progresses with the drum G the creaser K comes up and indents the material at $y$ $y$, and, holding it while the folders $a'$ come out, passes out of contact therewith, and the said folders then fold the stock over into the shape seen at Diagram No. 4, which completes the bag, which then passes on and is discharged between the cords $b$ $b$ and wheels A′ D′ in a finished state.

When the bag, with its bottom thus pasted and folded, is opened out or filled, it presents about the shape seen at Diagram No. 5.

It will be seen that by applying the paste as shown there is no danger of any of the bottom portions getting stuck to those portions of the sides which have necessarily to rest in contact with the inner surfaces of the bottom parts while the latter are being pasted and folded.

In conclusion, I would state I do not limit myself to the precise details of construction herein shown and described, as the same may in some respects be varied without departure from the principle of my invention, and I wish to be understood as including herein the mechanical equivalents of the devices hereinbefore described, especially as regards the means of folding.

Having so fully described my new machine for pasting and folding the bottoms of satchel-bottom bags as to enable one skilled in the art to fully understand and practice my invention, what I claim herein is—

1. In a machine for pasting and folding bag-bottoms, the combination, with a drum or carrier that moves in one direction only, of pasting and folding mechanisms arranged and operating to successively paste and fold, by one forward and one backward fold, the last two flaps of a satchel-bottom bag while the latter rests on the surface of said carrier, substantially as set forth.

2. In a machine for forming the bottoms of satchel-bottom bags, the combination, with the drum or carrier on which the blank is held, of a creaser, I′, for creasing or indenting the material at the line on which one of the flaps is to be turned down, and folders $b'$, arranged and operating to fold such flap over and down, substantially as set forth.

3. In a machine for forming the bottoms of satchel-bottom bags, the combination, with the drum or carrier on which the blank is held, of a creaser, K, for creasing or indenting the material at the line on which the other of the flaps is to be turned down, and folders $a'$, arranged and operating to press down onto its final position the last folded flap, substantially as set forth.

4. The combination, with a drum or carrier which moves in one direction only, of pasting, creasing, and folding mechanisms arranged and operating to apply paste to the last folded pair of flaps, crease the material at the lines on which said flaps are to be turned, and fold the said flaps down, all substantially as set forth.

5. The rotary paste-wheels, arranged to automatically move up to and away from the sack-supporting drum or carrier, in combination with the automatically and intermittently rotating paster and the said moving carrier, the whole arranged to operate subtantially as set forth.

In witness whereof I have hereunto set my hand and seal this 19th day of May, 1879.

JAS. ARKELL. [L. S.]

In presence of—
C. E. BARNES,
N. S. BRUMLEY.